Oct. 12, 1954    D. R. DE BOISBLANC    2,691,303
MAGNETIC TYPE FLOWMETER

Filed June 19, 1950    2 Sheets-Sheet 1

INVENTOR.
D. R. DE BOISBLANC

BY Hudson & Young

ATTORNEYS

Oct. 12, 1954     D. R. DE BOISBLANC     2,691,303
MAGNETIC TYPE FLOWMETER

Filed June 19, 1950     2 Sheets-Sheet 2

INVENTOR.
D. R. DE BOISBLANC
BY *Hudson & Young*
ATTORNEYS

Patented Oct. 12, 1954

2,691,303

UNITED STATES PATENT OFFICE 2,691,303

MAGNETIC TYPE FLOWMETER

Deslonde R. de Boisblanc, Bartlesville, Okla., assignor to Phillips Petroleum Company, a corporation of Delaware Application June 19, 1950, Serial No. 168,982

10 Claims. (Cl. 73—194)

This invention relates to flowmeters.

Heretofore considerable difficulties have been experienced in measuring the flow velocity of fluids, as through pipes or conduits, particularly when the flow rate is rather low. Flowmeters have previously utilized a constriction in the conduit through which the fluid passes, the fluid pressure upstream and downstream from the constriction being compared to provide an indication of flow rate. Further, various types of flowmeters have been proposed wherein a spinner or other mechanical element is rotated by the passage of fluid through the meter. In both cases, the presence of the flowmeter produces an undesirable pressure drop in the conduit and streamline conditions of flow are interfered with at low flow velocities.

It has also been proposed to establish a magnetic field in the conduit through which flow is to be measured, and to measure the capacitance between two opposite sides of the conduit, this capacitance changing in accordance with the flow rate when the aforesaid magnetic field is established across the conduit. I have found that improved results are obtained when the magnetic field in this type of flowmeter extends radially from center to periphery of the conduit rather than extending entirely across the conduit. With my arrangement of the magnetic field, various types of electrode configurations may be utilized and the flexibility of the system is increased in that either a push-pull or single ended circuit may be utilized, as desired, to provide a voltage representative of the flow rate.

It is an object of my invention to improve the construction and operation of flowmeters.

It is a still further object to provide a flowmeter of the magnetic type in which the magnetic field extends radially from the center to the periphery of the conduit through which flows a fluid whose velocity is to be measured.

It is a still further object to provide a flowmeter which is rugged, durable, has no moving parts, and is very accurate even at low flow rates.

Various other objects, advantages and features of the invention will become apparent from the following detailed description taken in conjunction with the accompanying drawings, in which:

Figure 1 is a vertical, sectional view, partially in elevation, of the flowmeter of my invention;

Figures 2 and 3 are, respectively, sectional views taken along the lines 2—2 and 3—3 of Figure 1;

Figure 1:
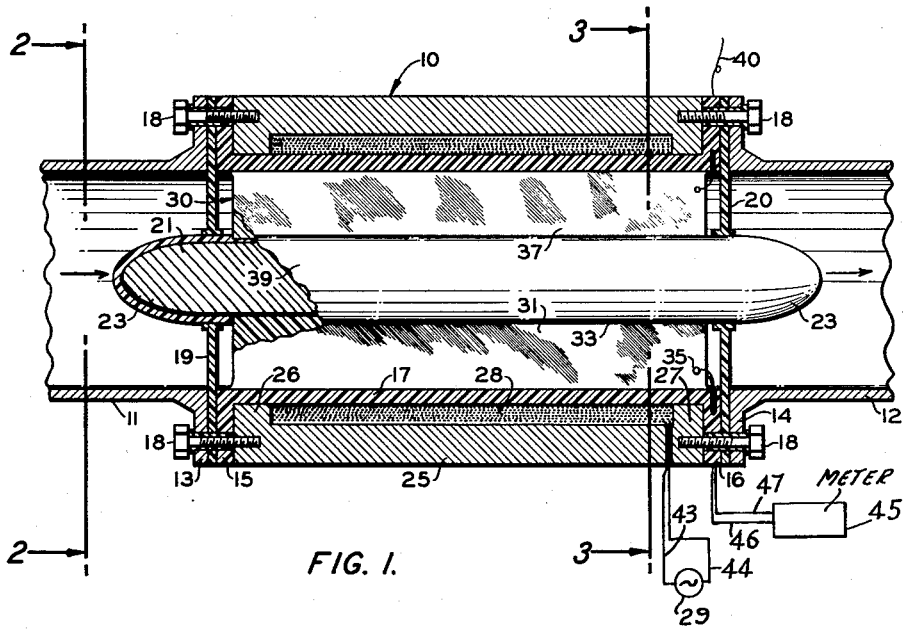

Referring now to the drawings in detail, the flowmeter may be conveniently incorporated in a conduit section 10 mounted between two conduit sections 11, 12 in any suitable manner. In the example shown, the conduit sections 11 and 12 are provided with flanges 13 and 14, respectively, which abut flanged portions 15 and 16 of a conduit portion 17 formed from insulating material. The two sets 13, 15 and 14, 16 of flanges are held in assembled position by bolts 18.

Figure 2:
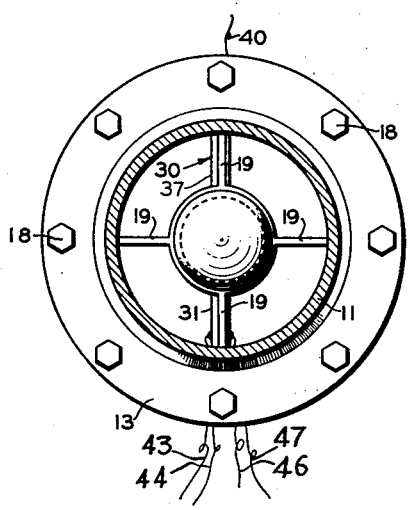
Figure 3:
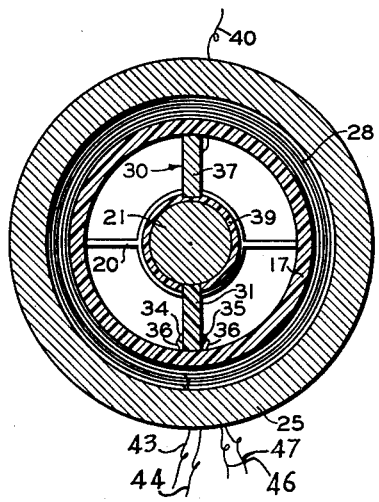

A pair of spiders 19 and 20 is held, respectively, between the two sets 13, 15 and 14, 16 of flanges by the bolts 18, and these spiders, in turn, support a generally cylindrical core 21 of magnetic material, this core being secured at its respective ends to the spiders, as by screws, not shown, Figure 2. The core 21 may be constructed from pressed, powdered magnetic material or, alternatively, it may be formed from laminated material arranged in the usual manner for forming magnetic cores. The ends of the core 21 are tapered, as indicated at 23, to provide proper streamline conditions of flow in the conduit section 17.

Mounted between the flanges 15, 16 is an annular member 25 of magnetic material, this member being provided with end portions 26, 27 abutting the respective flanges 15, 16 and engaging the outer surface of the conduit section 17. The end portions 26, 27 define the ends of an annular region between conduit section 17 and member 25 within which is wound a coil 28. When alternating current is supplied to this coil from a current source 29 which is connected to coil 28 by leads 43 and 44, a magnetic field is established which, during one cycle of each alternating current wave, extends radially inward from end portion 26 to the core, thence, longitudinally of the core, radially outward from the core to end portion 27, and longitudinally through member 25 to the end portion 26. During the other cycle of each alternating current wave, the magnetic field extends radially outward from the core to end portion 26, thence longitudinally of the member 25 to end portion 27, radially inward to the adjacent end of the core 21, and longitudinally to the other end of the core. Accordingly, there is established in the region of the conduit adjacent end portion 27 a radially directed magnetic field, the direction of the magnetic lines of force being reversed at each alternation of the current supplied to the coil.

Mounted interiorly of the conduit adjacent end portion 27 is an electrode structure 30 which includes a radially extending web 31 of insulating material which is secured at its outer end to conduit section 17, as by a screw, not shown, and which, at its interior end, abuts the magnetic core 21. To this end, the interior end 33 of the web is shaped to conform to the curvature of the core at the region of contact between these parts. Electrodes 34 and 35 are mounted on opposite sides of web 31 and these electrodes are connected to an external measuring instrument 45, shown in detail in Figure 5, by respective leads 46 and 47 which extend through suitable openings in conduit section 17 and end portion 27, as clearly illustrated in Figure 1, these openings being suitably sealed to prevent leakage of fluid from the conduit therethrough. Diametrically opposite web 31 is a web 37 of conductive non-magnetic metal which, at its outer end, is secured to conduit section 17 as by a screw, not shown, and which, at its interior end, fits within a sheath 39 of insulating material, this sheath completely enclosing core 21. The web 37 is connected by a lead 40 to a suitable measuring circuit, this lead extending through suitable passages in conduit section 17 and end portion 27, these passages being suitably sealed to prevent leakage of fluid from the conduit.

Figure 5:
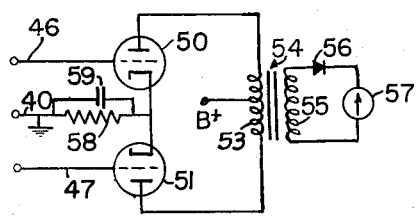
Figure 5 is a schematic view of a first form of measuring circuit adapted for use in this invention.

In one embodiment of this invention, as illustrated in Figure 5, leads 46 and 47 are connected to the control grids of respective vacuum tube triodes 50 and 51 which are connected to form a conventional push-pull amplifier. The anodes of tubes 50 and 51 are connected to opposite ends of the primary winding 53 of a transformer 54, the center tap of winding 53 being connected to a source of positive potential. The secondary winding 55 of transformer 54 is connected in series with a rectifier 56 and a current meter 57. The cathodes of tubes 50 and 51 are grounded through a common bias resistor 58 which is shunted by a capacitor 59. Lead 40 is connected to the amplifier ground.

In operation of this flowmeter, alternating current is supplied to coil 28 from source 29 with the result that a radial alternating magnetic field is established in the conduit at the region of the electrode assembly 30. As fluid passes through the conduit in the direction indicated by the arrows, Figure 1, ionized particles in the fluid are moved by the field in a circular path on a plane projected perpendicular to the axis of the conduit. That is to say, each charged particle in the fluid moves in a direction mutually perpendicular to the radial magnetic field and to the longitudinal path of the charged particle through the conduit. This displacement is, of course, proportional to the velocity of flow of the fluid through the conduit and constitutes a flow of electricity between web 37 and electrode 34, as well as between web 37 and electrode 35, the resultant voltages being of opposite phase due to the position of the electrodes on opposite sides of web 31. Thus, the current measured by the push-pull amplifier connected to leads 46, 47 and 40 is a function of flow velocity and is representative of the flow velocity. It will be evident that, as the radial field is reversed during the alternation of the current supplied to coil 28, that the direction of movement of positively charged particles is reversed. That is, the direction of movement of positively charged particles in their circular path is reversed at each alternation of the current supplied to the coil 28. The movement of negatively charged particles alternates in a similar fashion but, of course, the direction of movement is opposite to that of the positively charged particles. As a result, the potential appearing between web 37 and electrode 34 as well as the potential appearing between web 37 and electrode 35 is an alternating voltage of the same frequency as that supplied to coil 28.

Figure 4:
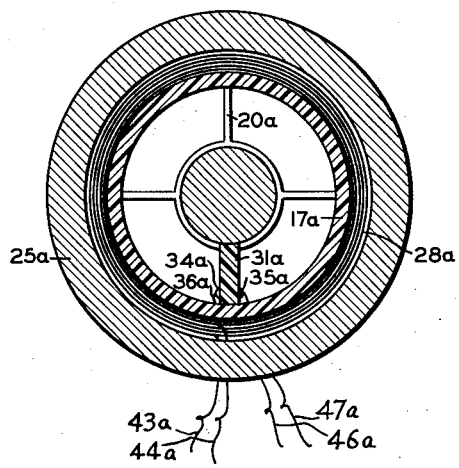
Figure 4 is a sectional view of a modification of the flowmeter taken along a line corresponding to line 3—3 of Figure 1.
Figure 6:
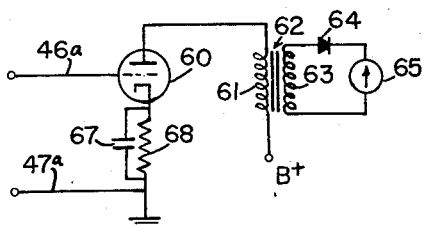
Figure 6 is a schematic view of a second form of measuring circuit adapted for use in this invention.

Although I have described the operation of the flowmeter in connection with a push-pull amplifier, a single ended amplifier may be easily substituted therefor. When it is desired to use a single ended amplifier, the conductive web 37 is replaced by a porous member of insulating material or eliminated. Also as illustrated in Figures 4 and 6, electrodes 34a and 35a are connected by respective leads 46a and 47a to the control grid of a vacuum tube triode 60 and to ground respectively. The anode of tube 60 is connected to a source of positive potential through a primary winding 61 of a transformer 62. The secondary winding 63 of transformer 62 is connected in series with a rectifier 64 and a current meter 65. The cathode of tube 60 is grounded through a bias resistor 67 having a capacitor 68 connected in shunt therewith. In this case, an alternating voltage representative of the rate of flow of fluid through the conduit is produced between electrodes 46a, 47a and fed to the input circuit of the amplifier. The use of the push-pull arrangement is desirable, however, since it eliminates in-phase hum voltages not related to flow.

It will be evident that more than one set of electrodes may be utilized, if desired, and these electrodes may be spaced at intervals along the magnetic core provided that they are connected in such manner that the outputs appearing between the electrodes are summed.

The described flowmeter produces very little interference or obstruction in the conduit due to the streamlining of the core 21 and to the fact that the webs 31, 37 and spiders 19, 20 are of very small dimensions and offer little or no resistance to the flow of fluid through the conduit. The described flowmeter is particularly suited to the accurate measurement of low flow rates, since the measuring means is electromagnetic in nature and does not depend upon the force exerted directly upon a movable element by the fluid. The radial magnetic field produces a useable output even at low velocities, although the fluid itself may contain only a relatively small number of charged particles.

While the invention has been described in connection with a present, preferred embodiment thereof, it is to be understood that this description is illustrative only and is not intended to limit the invention, the scope of which is defined by the appended claims.

I claim:

1. In a flowmeter, in combination, a conduit for passing an electrically conductive fluid whose velocity is to be measured, an elongated core of magnetic material disposed axially within said conduit, a coil mounted externally of said conduit, a magnetic structure disposed adjacent said coil for producing a radial magnetic field between a portion of said structure and said core, a pair of closely spaced electrodes mounted within said conduit between said core and said conduit, a web of insulating material extending radially from said core to said conduit and separating said electrodes whereby said electrodes lie in different radial planes, and leads extending from said electrodes to the exterior of said conduit.

2. In a flowmeter, in combination, a conduit for passing an electrically conductive fluid whose velocity is to be measured, an elongated tapered core of magnetic material disposed axially within said conduit, a coil mounted externally of said conduit, a magnetic structure surrounding said coil for producing a radial magnetic field between a portion of said structure and said core, a first web of conductive non-magnetic material extending radially from said core to said conduit adjacent said portion of the magnetic structure, a radially extending second web of insulating material mounted diametrically opposite said conductive web and extending from said core to said conduit, a pair of electrodes mounted on opposite sides of said web of insulating material so as to lie in different radial planes, and means for making electrical connections to said electrodes and to said web of conductive material.

3. In a flowmeter, in combination, a conduit section having a flange at each end thereof, a spider secured to each of said flanges, an elongated cylindrical core of magnetic material mounted axially of said conduit section and supported by said spiders, said core having tapered end portions, an annular member of magnetic material having flanged end portions abutting the flanges of said conduit section, a coil mounted between the central region of said member and said conduit, a web of insulating material positioned adjacent one of the flanged ends of said member and extending radially from said conduit to said core, a pair of electrodes disposed on opposite sides of said web of insulating material so as to lie in different radial planes, and means for making electrical connections to said electrodes through said conduit section.

4. In a flowmeter, in combination, a conduit section having a flange at each end thereof, a spider secured to each of said flanges, an elongated cylindrical core of magnetic material mounted axially of said conduit section and supported by said spiders, said core having tapered end portions, an annular member of magnetic material having flanged end portions abutting the flanges of said conduit section, a coil mounted between the central region of said member and said conduit, a web of conductive material positioned adjacent one of the flanged ends of said member, said web extending radially from said conduit to said core, a web of insulating material positioned diametrically opposite said web of conductive material and extending radially from said core to said conduit, a pair of electrodes mounted on opposite sides of said web of insulating material so as to lie in different radial planes, and means for making electrical connections to said electrodes and said web of conductive material.

5. In a flowmeter, in combination, a conduit for passing an electrically conductive fluid whose velocity is to be measured, an elongated tapered core of magnetic material disposed axially within said conduit, a coil mounted externally of said conduit, a magnetic structure disposed adjacent said coil for producing a radial substantially uniform magnetic field between a portion of said structure and said core, a plurality of closely spaced electrodes mounted within said conduit between said core and said conduit whereby said individual electrodes lie in different radial planes, and leads extending from said electrodes to the exterior of said conduit.

6. In a flowmeter, in combination a conduit for passing an electrically conductive fluid whose velocity is to be measured, an elongated tapered core of magnetic material disposed axially within said conduit, a coil mounted externally of said conduit, a magnetic structure disposed adjacent said coil for producing a radial magnetic field between a portion of said structure and said core, a plurality of closely spaced electrodes mounted within said conduit between said core and said conduit, a web of insulating material extending radially from said core to said conduit and separating one pair of said electrodes whereby said first pair of electrodes lie in different radial planes, and leads extending from said electrodes to the exterior of said conduit.

7. The combination in accordance with claim 2 further comprising a push-pull amplifier including a pair of electron tubes connected in opposition, said pair of electrodes being connected to respective grids of said pair of tubes, said web of conductive material being connected to the common cathode circuit of said amplifier, and means to measure the output signal of said amplifier.

8. In a flowmeter, in combination, a conduit for passing an electrically conductive fluid whose velocity is to be measured, means for establishing an alternating radial magnetic field in said conduit, a thin sheet of insulating material extending from the inner wall of said conduit radially inwardly, a pair of electrodes mounted in closely spaced relationship on opposite sides of said sheet whereby the individual electrodes of said pair lie in different radial planes, and leads extending from said electrodes to the exterior of said conduit.

9. In a flowmeter, in combination, a conduit for passing an electrically conductive fluid whose velocity is to be measured, means for establishing an alternating radial magnetic field in said conduit, a first electrode mounted within the interior of said conduit, a thin sheet of insulating material secured to the wall of said conduit and extending inwardly therefrom in a radial plane which contains said first electrode, second and third electrodes mounted on diametrically opposite sides of said sheet whereby said second and third electrodes lie in different radial planes which are symmetrical with respect to the radial plane containing said first electrode.

10. The combination in accordance with claim 9 further comprising a push-pull amplifier including a pair of electron tubes connected in opposition, said second and third electrodes being connected to respective grids of said pair of tubes, said first electrode being connected to the common cathode circuit of said amplifier whereby the output signal from said amplifier is zero in the absence of fluid flow through said conduit, and means to measure the output signal of said amplifier.

References Cited in the file of this patent

UNITED STATES PATENTS

| Number | Name | Date |
|---|---|---|
| 2,149,847 | Kolin | Mar. 7, 1939 |
| 2,435,043 | Lehde et al. | Jan. 27, 1948 |
| 2,583,724 | Broding | Jan. 29, 1952 |

OTHER REFERENCES

"Alternating Field Induction Flowmeter of High Sensitivity," A. Kolin, The Review of Scientific Instruments, vol. 16, No. 5, May 1945.